(12) United States Patent
Lewandowski

(10) Patent No.: US 11,671,269 B2
(45) Date of Patent: Jun. 6, 2023

(54) METHOD FOR OPERATING A SENSOR ARRANGEMENT IN A MOTOR VEHICLE ON THE BASIS OF A DSI PROTOCOL

(71) Applicant: Valeo Schalter und Sensoren GmbH, Bietigheim-Bissingen (DE)

(72) Inventor: Marek Lewandowski, Bietigheim-Bissingen (DE)

(73) Assignee: Valeo Schalter und Sensoren GmbH, Bietigheim-Bissingen (DE)

(*) Notice: Subject to any disclaimer, the term of this patent is extended or adjusted under 35 U.S.C. 154(b) by 429 days.

(21) Appl. No.: 16/637,933

(22) PCT Filed: Aug. 13, 2018

(86) PCT No.: PCT/EP2018/071867
§ 371 (c)(1),
(2) Date: Feb. 10, 2020

(87) PCT Pub. No.: WO2019/034579
PCT Pub. Date: Feb. 21, 2019

(65) Prior Publication Data
US 2021/0399906 A1  Dec. 23, 2021

(30) Foreign Application Priority Data
Aug. 15, 2017 (DE) ............... 10 2017 118 574.7

(51) Int. Cl.
*H04L 12/10* (2006.01)
*G01S 15/931* (2020.01)
(Continued)

(52) U.S. Cl.
CPC ............ *H04L 12/10* (2013.01); *G01S 15/931* (2013.01); *H04B 11/00* (2013.01);
(Continued)

(58) Field of Classification Search
CPC ... H04L 12/10; H04L 12/40045; H04L 67/12; H04L 2012/40273; H04L 67/125;
(Continued)

(56) References Cited

U.S. PATENT DOCUMENTS 9,343,959 B2 * 5/2016 Hammerschmidt .... H02M 3/07
2013/0070863 A1 * 3/2013 Ohl .................. H04L 12/40045
375/257
(Continued)

FOREIGN PATENT DOCUMENTS

DE   10 2010 002679 A1   9/2011
DE   10 2012 103907 A1   11/2013
(Continued)

OTHER PUBLICATIONS

Denso Corporation, freescale TM Semiconductor Inc., TRW Automotive Inc.: "DSI3 Bus Standard—Revision 1.00", Feb. 16, 2011 (Feb. 16, 2011), pp. 1-45, http://www.dsiconsortium.org/downloads/DSI3_%20Bus_Standard_r1.00.pdf, XP055510946 (45 pages).
(Continued)

*Primary Examiner* — Hai Phan
*Assistant Examiner* — Anthony D Afrifa-Kyei
(74) *Attorney, Agent, or Firm* — Osha Bergman Watanabe & Burton LLP

(57) ABSTRACT

The invention relates to a method for operating a sensor arrangement (2) in a motor vehicle (1), wherein
the sensor arrangement (2) has a central unit (3) and a plurality of sensor units (S1, S2, S3),
the central unit (3) and the sensor units (S1, S2, S3) are connected to a bus cable (4) and
via the bus cable (4) a communication takes place between the central unit (3) and the sensor units (S1, S2, S3) with the following steps:
(Continued)

Figure 1:
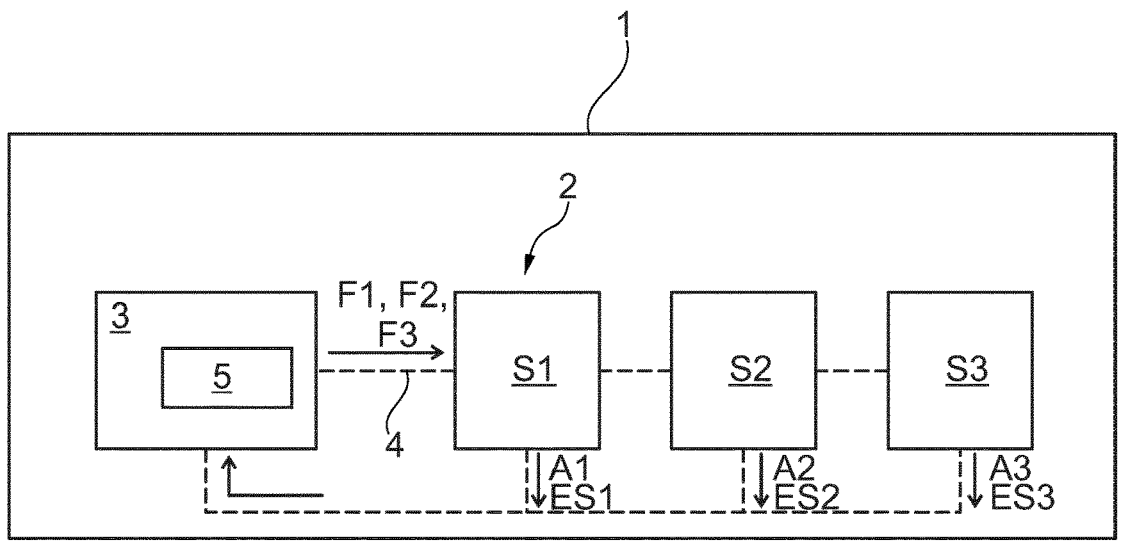

alternately carrying out a power supply phase (E) and a communication phase (K), supplying the sensor units (S1, S2, S3) with energy in the power supply phase (E), repeatedly carrying out a communication cycle in the communication phase (K), having the following steps: sending a command (F1, F2, F3) from the central unit (3) to at least one sensor unit (S1, S2, S3), receiving a response (A1, A2, A3) of a sensor unit (S1, S2, S3) in the central unit (3), receiving a respective energy status information item (ES1, ES2, ES3) from all sensor units (S1, S2, S3) in the central unit (3) and interrupting the repeated implementation of the communication cycle in the communication phase (K) by a supplementary power supply phase (Z) if one of the energy status information items (ES1, ES2, ES3) originating from the sensor units (S1, S2, S3) indicates that the corresponding sensor unit (S1, S2, S3) requires additional electrical energy for continued operation. In this way, an effective method for operating the sensor arrangement (2) in a motor vehicle (1) is provided, in which a communication between the master and the slaves with a high bandwidth is normally possible.

11 Claims, 1 Drawing Sheet

(51) Int. Cl.
  *H04B 11/00* (2006.01)
  *H04L 12/40* (2006.01)
  *H04L 67/12* (2022.01)

(52) U.S. Cl.
  CPC ........ *H04L 12/40045* (2013.01); *H04L 67/12* (2013.01); *H04L 2012/40273* (2013.01)

(58) Field of Classification Search
  CPC ..... G01S 15/931; H04B 11/00; G08B 29/123; G05B 11/01; G05B 11/00; G05B 11/011; G05B 11/012; G05B 11/06; G05B 11/14; G05B 11/26; G05B 11/32; G05B 11/36; G05B 15/02; G05B 2219/2642; H05B 37/0272; H05B 47/195; Y02B 20/40; Y02B 20/48; Y10T 307/766; Y10T 307/773; H04W 4/38; H04W 52/0209; G01C 19/00; G01K 1/024; G01P 15/165; Y02D 30/70

See application file for complete search history.

(56) References Cited

U.S. PATENT DOCUMENTS

| | | | | |
|---|---|---|---|---|
| 2013/0200725 | A1* | 8/2013 | Apelker | ................. G05B 15/02 |
| | | | | 323/318 |
| 2016/0087672 | A1* | 3/2016 | Hammerschmidt | ... H04B 1/401 |
| | | | | 375/296 |

FOREIGN PATENT DOCUMENTS

| | | | |
|---|---|---|---|
| DE | 10 2013 226376 | A1 | 6/2015 |
| DE | 10 2014 113456 | A1 | 3/2016 |
| EP | 2263102 | B1 | 8/2013 |
| NO | 2016-154345 | A1 | 9/2016 |
| WO | 2016-206921 | A1 | 12/2016 |
| WO | WO-2016206921 | A1 * | 12/2016 ........... A61B 5/0205 |

OTHER PUBLICATIONS

International Search Report and Written Opinion in corresponding International Application No. PCT/EP2018/071867, dated Oct. 5, 2018 (14 pages).

German Search Report in corresponding German Application No. 10 2017 118 574.7, dated Aug. 3, 2018 (6 pages).

* cited by examiner

METHOD FOR OPERATING A SENSOR ARRANGEMENT IN A MOTOR VEHICLE ON THE BASIS OF A DSI PROTOCOL

The invention relates to a method for operating a sensor arrangement in a motor vehicle on the basis of a DSI protocol, wherein the sensor arrangement has a central unit as a master and a multiplicity of sensor units as slaves controlled by the master, the central unit and the sensor units are connected to a bus cable and communication between the central unit and the sensor units takes place via the bus cable. The invention also relates to the use of such a method in a motor vehicle, a sensor arrangement, and a vehicle having such a sensor arrangement.

The DSI Protocol Distributed System Interface, see: DSI3 Bus Standard, Revision 1.00 dated 16 Feb. 2011, the specification of which hereby forms part of the disclosure of the present invention by explicit incorporation, is a protocol that allows a sensor network to be built on the basis of a simple two-wire cable arrangement, in which a master communicates with one or more slaves via a two-wire bus cable. The DSI protocol is based primarily on the use in motor vehicles, in order by means of the master to poll and/or control a multiplicity of slaves, in particular sensors and actuators.

The specification of the DSI protocol stipulates that such a sensor arrangement can be operated in one of two operational classes, these being on the one hand the "Signal Function Class" and on the other hand the "Power Function Class". The protocol also stipulates essentially three different modes in which the bus can be used between the master and the slaves:

In the CRM mode (Command and Response mode) a bi-directional communication takes place between the master and the slaves. The master sends a command (Command), to which the slaves respond (Response). This method is used, for example, to configure the slaves or to query specific values from a slave selectively.

In the PDCM mode (Periodic Data Collection mode) the slaves transfer comparatively large amounts of data to the master within a specified time slot, wherein the transmission activity of the master is confined to providing the slaves a reference point for determining this time slot by means of a synchronisation signal (Broadcast Read Command). The slaves have already been equipped with information about their respective time slot in advance, so that in response to the synchronisation signal they determine their respective transmission time interval, on the basis of which they can send their sensor data to the master.

In the power phase, relatively large amounts of electrical energy are transferred in order to supply the slaves with high energy consumption with sufficient energy.

The above-mentioned Signal Function Class in accordance with the above-mentioned specification is used primarily for the connection of slaves with low energy consumption and relatively high data traffic, which is to be sent from the slave to the master. After commissioning a sensor arrangement of the Signal Function Class a first phase of the communication takes place between the master and the slave in the CRM mode, during which the slave is usually configured, for example in relation to the parameters of the above-mentioned PDCM time slot for this slave. Once this phase is completed, the sensor arrangement thus changes over into the PDCM mode, in which the slaves always transmit the acquired data to the central entity in the respectively assigned time slot in response to the synchronisation signal of the master. This phase in the PDCM mode is usually not exited again until the operation of the sensor arrangement is interrupted. A power-phase is not provided in accordance with the Signal Function Class, and on account of the low energy consumption of the slaves nor is it required.

The above-mentioned Power Function Class is used primarily for the connection of slaves with relatively high energy consumption and relatively low data traffic, which is to be sent from the master to the slave. In the operation of a sensor arrangement of the Power Function class, phases of the communication between the master and the slave in the CRM mode on the one hand take place alternately with power supply phases on the other hand. The durations of the power phases usually greatly predominate. Supplying a comparatively large amount of energy to the slaves in these phases at a higher voltage compared to the CRM mode means, in particular, that actuators can be operated, wherein this is usually carried out on the basis of control commands transmitted previously from the master to the slave in the CRM phase. The PDCM mode is not applicable in accordance with the Power Function class, because with the above-mentioned actuators, due to the low data volume it is also not required.

In the PDCM mode, the data transmission follows a fixed schema, specified by the master. In this context each slave is generally assigned a fixed time slot, i.e. a specified period of time relative to a synchronisation signal emitted by the master, in which data are to be transmitted from the respective slave to the master.

In WO 2016/054345 A1 an ultrasound system for monitoring the condition or the integrity of a structure is described, such as is used in the oil, gas or power generation industry. The system comprises a multiplicity of ultrasonic sensors and at least one digital sensor interface.

Document DE 10 2013 226 376 A1 describes a method for operating a sensor system with an ultrasonic sensor and a control unit, wherein data from the ultrasonic sensor to the control unit are current-modulated and data from the control unit to the ultrasonic sensor are voltage-modulated. This solution allows, after modification of an appropriate PS15 data bus interface, just such a data bus and a LIN data bus for data transmission to be combined with one another to exploit the advantages of the two bus systems.

In DE 10 2012 103 907 A1 a method is described for operating a receiver unit of a motor vehicle control unit which is connected to a transmitter unit. The receiver unit appends an identifier to the received signal, which contains a virtual address of the transmitter unit. This can be used to connect a sensor unit according to the PSI5 Version1 standard to a motor vehicle control unit which processes signals in the PSI Version2 standard.

Finally, document EP 2 263 102 B1 describes an ultrasound-based driver assistance system having a plurality of sensors. The sensors are each assigned a unique identification code, which can be read out by a control unit via an interface. The interface is a 2-wire bus interface which is designed to comply with a Peripheral Sensor Interface (PSI).

The object of the invention is to specify such a method for operating a sensor arrangement in a motor vehicle on the basis of a DSI protocol, in which a communication between the master and the slaves with a high bandwidth is normally possible.

This object is achieved by the subjects of the independent patent claims. Preferred extensions of the inventions are described in the dependent claims.

According to the invention therefore, a method for operating a sensor arrangement in a motor vehicle on the basis of a DSI protocol is provided, wherein the sensor arrangement has a central unit as a master and a plurality of sensor units as slaves controlled by the master, the central unit and the sensor units are connected to a bus cable and via the bus cable a communication takes place between the central unit and the sensor units with the following steps:

alternately carrying out a power supply phase, on the one hand, and a communication phase, on the other hand, wherein the power supply phase and the communication phase are each maintained for a predetermined duration, supplying the sensor units with electrical energy in the power supply phase (E) as long as the power supply phase continues, repeatedly carrying out a communication cycle in the communication phase as long as the communication phase continues, having the steps: sending a command from the central unit to at least one sensor unit, receiving at least one response of a sensor unit in the central unit, receiving a respective energy status information item from all sensor units in the central unit and interrupting the repeated implementation of the communication cycle in the communication phase by a supplementary power supply phase if at least one of the energy status information items originating from the sensor units indicates that the corresponding sensor unit requires additional electrical energy for continued operation.

It is therefore an essential aspect of the invention that the communication phase can be interrupted by a supplementary power supply phase, if there is a risk that a sensor unit cannot perform a further communication cycle without additional energy. In this way, the duration of the communication phases can be chosen to be longer than is conventionally the case. This means it is no longer necessary to ensure for all possible worst-case scenarios that the energy transferred to the sensor units is actually sufficient for the full duration of the communication phase. In an "emergency" an interruption of the communication phase can ultimately be brought about by a supplementary power supply phase, within which additionally required energy is transferred. This leaves more time for the communication phases, which in comparison to conventional solutions can result in an increase in the bandwidth for data transmission between the master and the slaves.

In principle, it is possible that the communication phase is not interrupted at all or only once for a supplementary power supply phase. In accordance with a preferred development of the invention, however, a further interruption of the repeated implementation of the communication cycle in the communication phase by a respective supplementary power supply phase is also possible if at least one of the energy status information items originating from the sensor units indicates that the corresponding sensor unit requires additional electrical energy. This further interruption can also be followed by an additional interruption for a supplementary power supply phase.

In accordance with the invention it is not absolutely essential to extend the communication phase if it has been interrupted by a supplementary power supply phase. In accordance with a preferred refinement of the invention, however, it is provided to extend the predetermined duration of the communication phase by the duration of the supplementary power supply phase or the supplementary power supply phases. It can thus be ensured that, in fact, the entire planned communication between the master and the slaves can be handled without parts of this communication needing to be shifted to a later communication phase.

In accordance with a preferred refinement of the invention, it is provided that the occurrence of the supplementary power supply phases is recorded and the duration of the communication phases is successively extended as long as no supplementary power supply phase occurs. Such an extension of the communication phases improves the bandwidth for the communication and can therefore be "risked", because due to the possible supplementary power supply phases a continued operation can be guaranteed even if a sensor unit would otherwise no longer have enough energy available to it. In this way, the proportion of the time available for the communication phases can preferably be enlarged to such an extent that virtually no, or only very infrequent, supplementary power supply phases will be required.

It is within the scope of the invention that a sensor unit signals by means of its energy status information that it needs additional electrical energy, already several communication cycles before the time at which enough energy would no longer be available to it for continued operation. It is preferably provided that a sensor unit first indicates by means of the energy status information that it needs additional electrical energy only when the corresponding sensor unit is able to implement fewer than a predetermined number of communication cycles. The predetermined number of communication cycles is very particularly preferably 1. In this way, the energy available to the individual sensor units is utilised to the full, and no interruption of the communication phase takes place until further operation within the communication phase would actually otherwise no longer be possible. In this way, a particularly high bandwidth in the data transmission between the master and the slaves is achieved.

The invention also relates to the use of a method as previously described, in a motor vehicle. The invention also relates to a sensor arrangement which is configured to operate by means of a method as previously described. Finally, the invention also relates to a motor vehicle having such a sensor arrangement.

Overall, it is true for the invention that the sensor units and the central unit are preferably connected to one another in series via the bus cable, thus in the so-called "daisy-chain" configuration. In addition, in accordance with a preferred refinement of the invention the sensor units each have at least one actuator of the Power Function class. It is particularly preferable if the sensor arrangement overall is a type of the Power Function class. In addition, the bus cable is preferably a two-wire cable. In addition, it is preferably provided that the sensor arrangement has ultrasonic sensor units for sending and/or receiving ultrasound signals as sensor units.

In the following, the invention is described in greater detail with reference to the drawings based on preferred exemplary embodiments. The features described can represent an aspect of the invention both individually and in combination.

Figure 2:
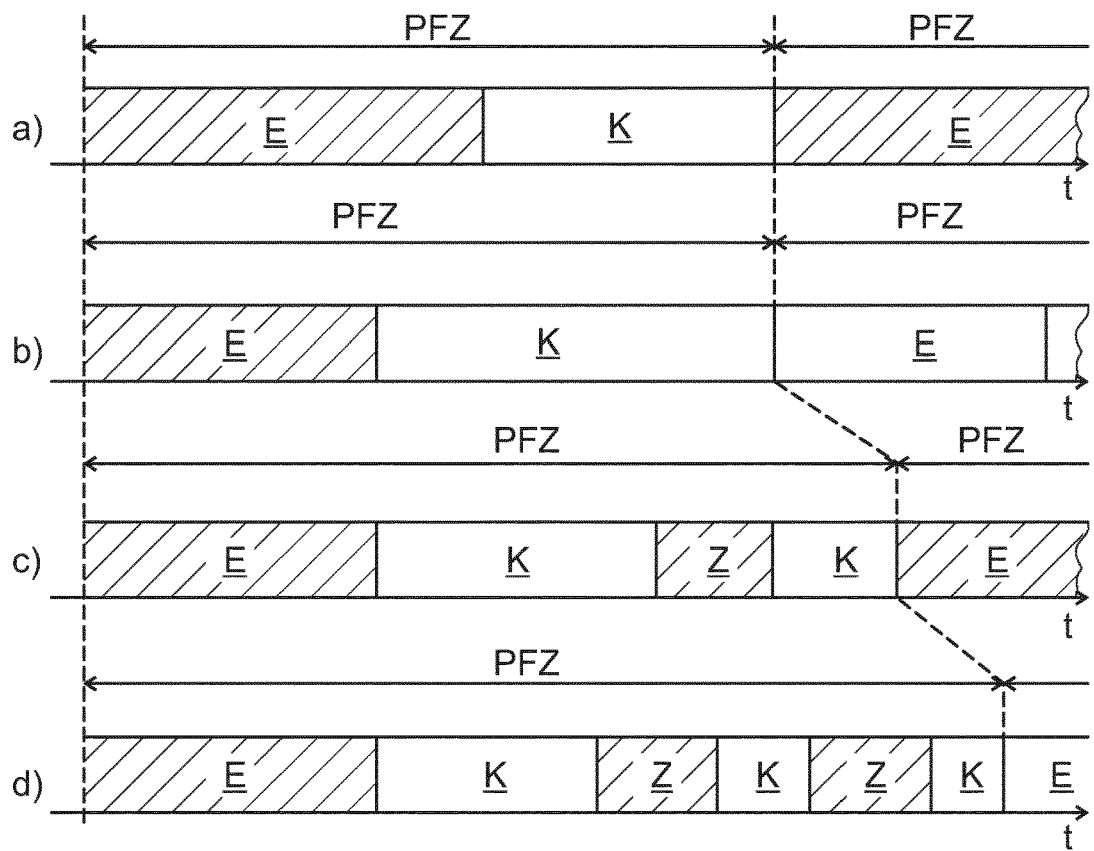

Shown are:

FIG. 1 a schematic representation of a vehicle with a sensor arrangement according to a preferred exemplary embodiment of the invention with a central unit as a master and three sensor units as slaves in a daisy-chain configuration and FIG. 2 a schematic representation of the temporal sequence of the power supply phase, the communication phase and the supplementary power supply phases in various cases, according to a preferred exemplary embodiment of the invention.

FIG. 1 shows a schematic representation of a vehicle 1 having a sensor arrangement according to a preferred exemplary embodiment of the invention. The sensor arrangement 2 has a central unit 3 and three sensor units S1, S2 and S3. The master 3 and the sensor units S1, S2, S3 are connected to each other by means of a bus cable 4, which is implemented as a two-wire cable. It is the case furthermore that the sensor units S1, S2, S3 with the central unit 3 are connected in series with each other, i.e. in a so-called daisy-chain configuration.

Within the meaning of the above-mentioned DSI3 specification the central unit 3 represents a master which is connected via the bus cable 4 to the three sensor units S1, S2, S3 acting as slaves in the sense of the DSI3 specification, so that overall a bus in the sense of the DSI3 specification is present. Furthermore, the sensor units S1, S2, S3 are sensor units with actuators that have a relatively high energy consumption, and therefore fall under the above-mentioned Power Function class. As already explained above, in the operation of the present sensor arrangement 2 of the Power Function class, power supply phases on the one hand and communication phases on the other hand therefore take place alternately, as described in detail below by reference to FIG. 2.

FIG. 2 shows four different cases a) to d) of the sequence of Power Function cycles PFZ, which are each repeated and include both an energy transmission from the central unit 3 to the sensor units S1, S2, S3 and a communication between the central unit 3 and the sensor units S1, S2, S3. In case a) a relatively long power supply phase E takes place, in which energy is transferred from the central unit 3 to the sensor units S1, S2, S3.

During this power supply phase, no communication takes place between the central unit 3 and the sensor units S1, S2, S3.

The power supply phase E is followed by a communication phase K, within which a communication between the central unit 3 and the sensor units S1, S2, S3 is carried out. During this communication phase, no energy supply to the sensor units S1, S2, S3 takes place. As well as responses A1, A2, A3 in each case energy status information items ES1, ES2, ES3 are also passed on to the bus. In this communication phase, as is apparent from FIG. 1, the central unit 3 sends commands F1, F2, F3 such as questions, to the sensor units S1, S2, S3, which respond thereto with responses A1, A2, A3, which are sent to and received by the central unit 3. With the end of the communication phase K the Power Function cycle PFZ also ends and a new identical Power Function cycle PFZ starts with a new power supply phase E.

In case a) the duration of the power supply phases E is long enough that sufficient energy can be transferred to the sensor units S1, S2, S3, so that there is always enough energy available to them during the communication phase K. Operation is therefore ensured during the entire communication phase K without additional energy needing to be provided to the sensor units S1, S2, S3 during this time. In principle, however, the method described in the present case for operating the sensor arrangement 2 provides that a communication phase K can be interrupted in order then to transfer additional energy in a supplementary power supply phase Z to those sensor units S1, S2, S3 which need additional energy to continue to be operated.

For this purpose, in addition to their responses A1, A2, A3 already described above, the sensor units S1, S2, S3 in each case also pass energy status information items ES1, ES2, ES3 onto the bus. These energy status information items ES1, ES2, ES3 indicate whether or not the respective sensor unit S1, S2, S3 requires additional electrical energy for continued operation. Specifically, according to the preferred exemplary embodiment of the invention described in the present case, it is provided that an energy status information item ES1, ES2, ES3 of a respective sensor unit S1, S2, S3 indicates that the corresponding sensor unit S1, S2, S3 requires additional electrical energy for continued operation if no further communication cycle would actually be possible within the current communication phase K without the corresponding sensor unit S1, S2, S3 being supplied with additional electrical energy beforehand. In the central unit 3 this energy status information ES1, ES2, ES3 is recorded and evaluated by an energy status monitor 5 in order to initiate a supplementary power supply phase Z as necessary.

In the present case, the occurrence of supplementary power supply phases Z is then recorded, in order to adjust the duration of the power supply phases E in such a way that the probability of the occurrence of at least one supplementary power supply phase Z is greater than zero. Because in case a) no supplementary power supply phases Z have occurred, in case b) the power supply phase E is now shortened compared to case a). In this way, a larger time interval for the communication phase K is available, without the Power Function cycle PFZ being extended. During operation of the sensor units S1, S2, S3 in case b) the energy transmitted in the power supply phase E is still sufficient to last for the entire duration of the communication phase K, without the sensor units S1, S2, S3 requiring additional energy. Therefore, in principle, a further reduction in the power supply phase E could be made. However, if the operation of the sensor units S1, S2, S3 changes this state of affairs may be different, as described below for case c).

In case c) it is now the case that for the same duration of the power supply phase E and hence the same energy transmitted to the sensor units S1, S2, S3, due to a different operation of the sensor units S1, S2, S3 the energy of at least one sensor unit S1, S2, S3 is not sufficient to last for the entire duration of the communication phase K. In response to the appropriate transmission of an energy status information item ES1, ES2, ES3 from one of the sensor units S1, S2, S3 indicating that additional energy will be required for the further operation of the corresponding sensor unit S1, S2, S3, the communication phase K is then interrupted by a supplementary power supply phase Z. In this supplementary power supply phase Z the sensor units S1, S2, S3 are supplied with additional energy, so that they can continue to be operated and the communication phase K can be completed thereafter.

The entire communication phase K, including its interruption by the supplementary power supply phase Z, is thus extended exactly by the duration of this supplementary power supply phase Z, thus resulting in a Power Function cycle PFZ which is also extended exactly by the duration of the supplementary power supply phase Z. This extension of the Power Function cycle PFZ by the duration of the supplementary power supply phase Z allows the communication between the central unit 3 and the sensor units S1, S2, S3 to be completed in the same way as in a normal case, in which no interruption of the communication phase K had occurred.

Finally, in case d) it is shown that a multiple interruption of the communication phase K can also occur. In the present case, two interruptions by a respective supplementary power supply phase Z occur in order to ensure the continued operation of the sensor units S1, S2, S3. Here, also, the Power Function cycle PFZ is extended overall by the entire duration of the supplementary power supply phases Z to ensure a complete communication between the central unit 3 and the sensor units S1, S2, S3.

LIST OF REFERENCE SIGNS 1 motor vehicle
2 sensor arrangement
3 central unit
4 bus cable
5 energy status monitor
S1 sensor unit
S2 sensor unit
S3 sensor unit
E power supply phase
K communication phase
Z supplementary power supply phase
F1 command
F2 command
F3 command
A1 response
A2 response
A3 response
ES1 energy status information
ES2 energy status information
ES3 energy status information
PFZ power function cycle

The invention claimed is:

1. A method for operating a sensor arrangement in a motor vehicle on the basis of a DSI protocol, wherein:
the sensor arrangement has a central unit as a master and a plurality of sensor units as slaves controlled by the master,
the central unit and the sensor units are connected to a bus cable, and
via the bus cable a communication takes place between the central unit and the sensor units the method comprising:
alternately carrying out a power supply phase, on the one hand, and a communication phase, on the other hand, wherein the power supply phase and the communication phase are each maintained for a predetermined duration;
supplying the sensor units with electrical energy in the power supply phase as long as the power supply phase continues; and
repeatedly carrying out a communication cycle in the communication phase as long as the communication phase continues, by:
sending a command from the central unit to at least one sensor unit,
receiving at least one response of a sensor unit in the central unit, receiving a respective energy status information item from all sensor units in the central unit and intentionally interrupting the repeated implementation of the communication cycle in the communication phase by a supplementary power supply phase, when at least one of the energy status information items originating from the sensor units indicates that the corresponding sensor unit requires additional electrical energy for continued operation.

2. The method according to claim 1, further comprising:
interrupting once more the repeated implementation of the communication cycle in the communication phase by a respective supplementary power supply phase, if at least one of the energy status information items originating from the sensor units indicates that the corresponding sensor unit requires additional electrical energy.

3. The method according to claim 1, further comprising:
extending the predetermined duration of the communication phase by the duration of the supplementary power supply phase or the supplementary power supply phases.

4. The method according to claim 1, further comprising:
recording the occurrence of the supplementary power supply phases,
adjusting the duration of the power supply phases in such a way that the probability of the occurrence of at least one supplementary power supply phase is greater than zero.

5. The method according to claim 1, further comprising:
specifying by the energy status information that a sensor unit requires additional electrical energy, when the corresponding sensor unit can now only perform fewer than a predetermined number of communication cycles.

6. The method according to claim 5, wherein the predetermined number of communication cycles is equal to 1.

7. The method according to claim 1, wherein the method is performed in a motor vehicle.

8. A non-volatile, computer-readable storage medium having commands stored thereon, which when executed on a processor implement the method according to claim 1.

9. A sensor arrangement, which is configured for operation by the method according to claim 1.

10. The sensor arrangement according to claim 9, comprising ultrasonic sensor units for sending and/or receiving ultrasonic signals as sensor units.

11. The sensor arrangement according to claim 10, having a central unit which has an energy status monitor, with which in response to the reception of the energy status information originating from the sensor units the communication phase is interrupted by a supplementary power supply phase.

* * * * *